Feb. 27, 1951 F. ELIAS-REYES 2,543,156
PNEUMATIC WHEEL

Filed April 5, 1948 3 Sheets-Sheet 1

INVENTOR.
Francisco Elias-Reyes,
BY Victor J. Evans & Co.
ATTORNEYS

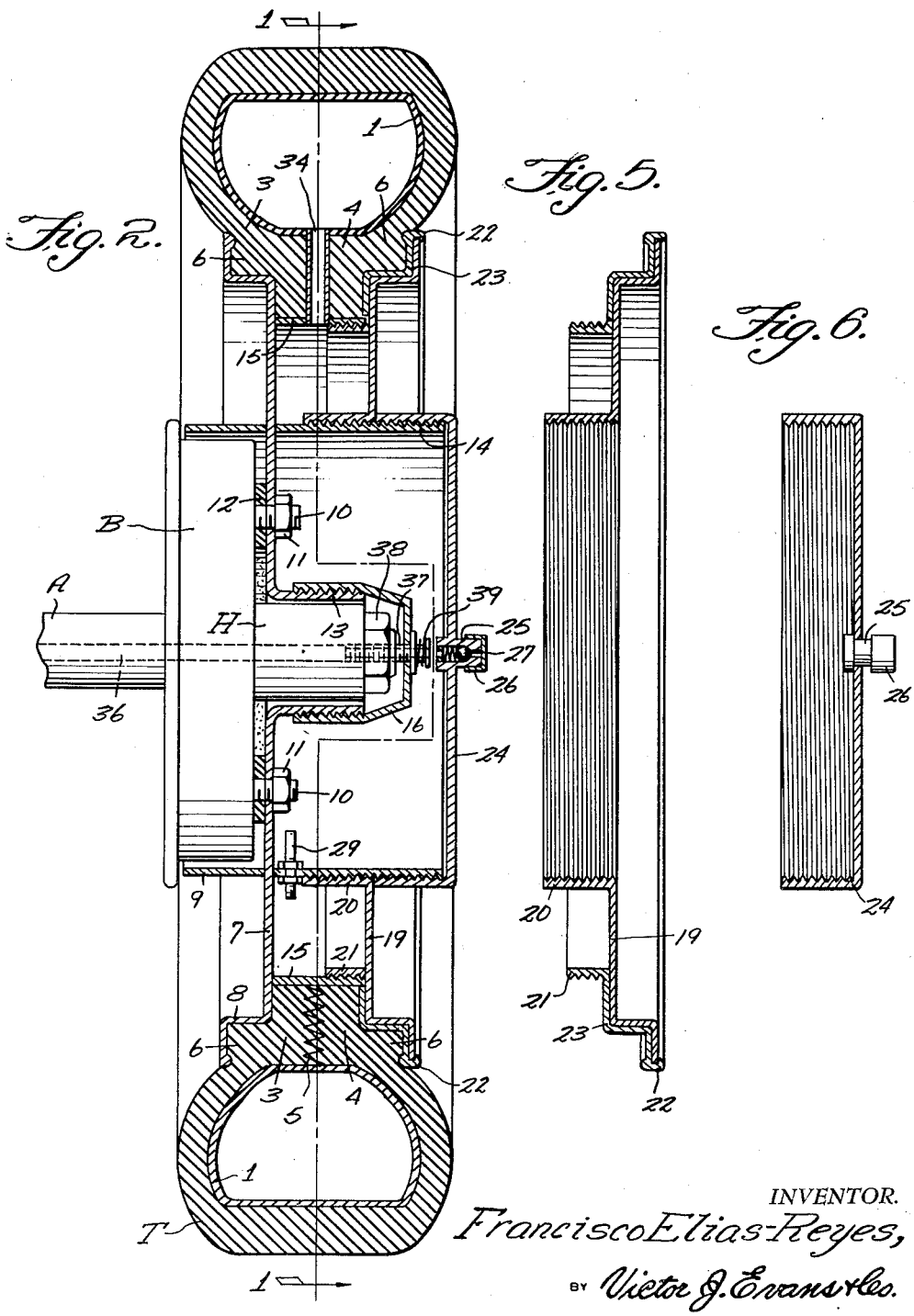

Feb. 27, 1951 F. ELIAS-REYES 2,543,156
PNEUMATIC WHEEL
Filed April 5, 1948 3 Sheets-Sheet 3
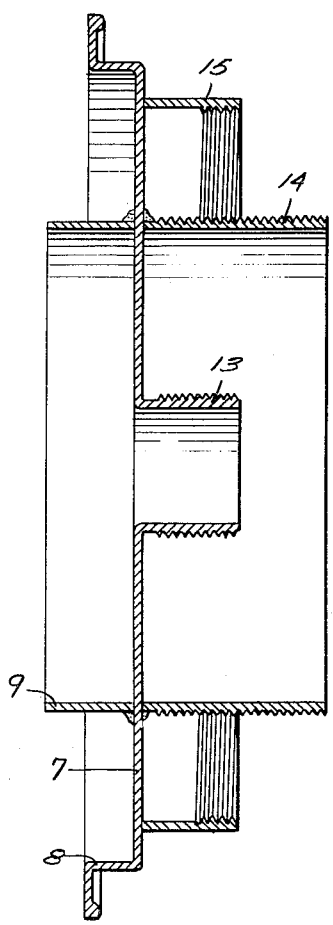
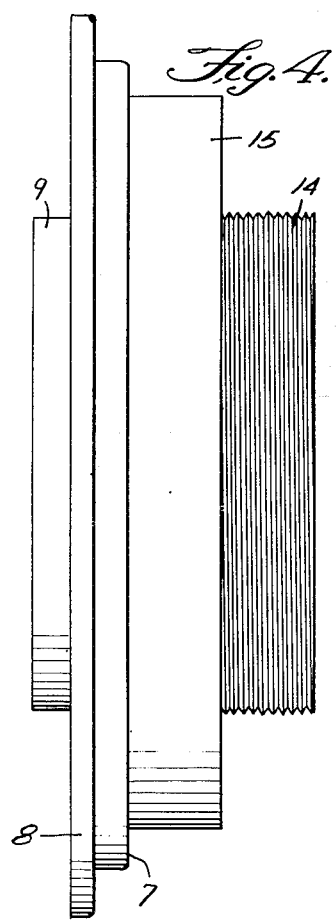
INVENTOR.
Francisco Elias-Reyes,
BY Victor J. Evans & Co.
ATTORNEYS Patented Feb. 27, 1951

2,543,156

UNITED STATES PATENT OFFICE 2,543,156

PNEUMATIC WHEEL

Francisco Elias-Reyes, San Salvador, El Salvador

Application April 5, 1948, Serial No. 19,133

9 Claims. (Cl. 152—418)

The present invention relates generally to resilient tires and wheels for automotive vehicles, which wheels are provided with inflating means, and a wheel-carried supply of compressed air available for use when required, and more specifically to an improved pneumatic wheel of the metal-disk, sectional type including a removable or detachable section that may readily be mounted in place for durable use, and which may with equal facility be dismounted or removed when necessary or desirable for repairs or replacements.

The invention involves a minimum number of parts that may with facility be manufactured at low cost of production, the parts may be assembled with convenience, and the resulting wheel structure may be mounted, as on an axle and brake drum of the automotive vehicle, to provide a smooth running wheel that automatically maintains the desired pneumatic pressure within the tire of the wheel.

Means are provided whereby a wheel-carried air reservoir may be supplied with compressed air in usual manner from a conventional air pump, or the reservoir may be replenished with compressed air from a motor operated compressor carried by the vehicle, and the reservoir is equipped with means for inflating, and for maintaining the inflation of the tire at desired pressure.

The invention consists in certain novel features of construction, and combinations and arrangements of parts as will hereinafter be described and more particularly set forth in the appended claims. It will however be understood that changes and alterations are contemplated and may be made in these exemplifying drawings and mechanical structures, within the scope of my claims, without departing from the principles of the invention.

Figure 2 is an enlarged vertical sectional view, as at line 2—2 of Fig. 1.

Figure 3 is a sectional view of the stationary metal wheel section; and Figure 4 is an exterior view of this wheel section.

Figure 5 is a sectional view of the removable or separable metal wheel section; and Figure 6 is a sectional view of the removable cover plate for the wheel.

Figure 1:
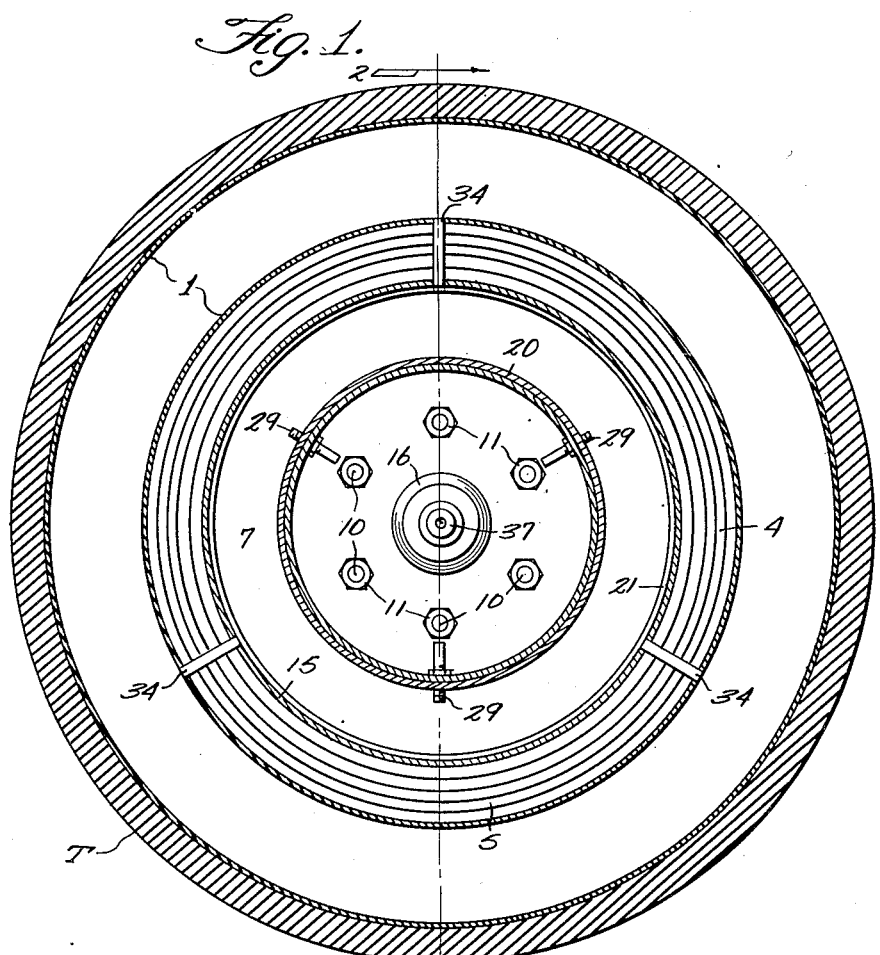
Figure 1 is a vertical sectional view of a pneumatic wheel in which my invention is physically embodied, as at line 1—1 of Fig. 2.

In order that the general arrangement and utility of parts may readily be understood I have shown in the assembly view Fig. 2, a portion of a wheel axle A and the brake drum B of a wheel having a usual hub portion H, and the split-wall pneumatic tire of suitable elastic and resilient material is designated as a whole by the letter T.

The split tire T is provided with a lining 1 preferably of rubber to form a pneumatic tube, and the tire is fashioned with a split inner ring comprising adjoining sections 3 and 4, the complementary faces of which are fashioned with concentric rings and grooves, as indicated at 5, compressed into an air-tight fit, and the split ring forms inner and outer annular shoulders 6, 6, for mounting the tire in the wheel sections.

The inner stationary or fixed wheel section includes a circular flat metal disk 7, having an annular flanged rim 8 for supporting one of the tire shoulders 6, and an inner annular guard 9 that surrounds the brake drum B, and this disk 7 is rigidly mounted on the brake drum by means of bolts 10 and nuts 11, with a packing or gasket 12 between the disk and the drum.

The metal disk 7 is also fashioned at its central portion with a hub band 13 of comparatively small diameter to enclose the hub portion H of the brake drum B, and at the outer side of the disk 7 an externally threaded collar 14 is fashioned to form a continuation of the annular guard 9 at the inner side of the wheel section. Near the angular rim 8 of the disk 7 another attaching collar, as 15, is integral with or welded to the disk, and this narrow attaching collar is internally threaded as shown.

In Fig. 2 it will be seen that the externally threaded hub ring 13 is provided with a screw threaded cap 16 to close the hub section of the stationary or fixed section of the wheel.

The split tire is compressed and maintained in air-tight condition by means of a removable or separable wheel section that is threaded on the fixed section of the wheel and together, the two wheel sections support the tire in inflated condition, the wheel as a whole being rigid with and rotatable with the axle and brake drum.

The outer metallic wheel section includes a circular disk 19 that is equipped at its inner side with an internally threaded annular flange 20 that screws upon the complementary collar 14 of the inner wheel section, and the outer wheel section also has an externally threaded attaching flange 21 that screws upon, or into the internally threaded collar 15 of the inner section. By this arrangement of parts of the two wheel sections the collar 14 and flange 20 provide a central air reservoir, and the collar 15 and flange 21 form an annular air chamber surrounding the central air reservoir.

For co-action with the outer annular shoulder 6 of the pneumatic tire the separable wheel section is fashioned with an angular rim 22, and a lining ring 23 for frictional engagement with the shoulder to insure a tight joint between parts.

The outer side of the air supply reservoir is closed by means of a detachable internally threaded wheel cap 24 that is screwed upon the externally threaded collar 14 of the inner fixed wheel section against the outer face of the disk 19 of the outer wheel section. The wheel cap is provided with a filling valve device that includes a casing 25 integral with the cap and a closure 26 therefore, and an air injection ball valve 27 located within the casing 25 is resiliently pressed by spring 28 to closed position.

Air under pressure from a suitable pump or compressor may be injected through the check valve device into the air reservoir, through the air chamber, and into the pneumatic tire, filling the three air spaces of the wheel and tire with air at a desired pressure for sustaining the wheel in proper running condition. Should the pressure in the tire decrease to an undesirable degree, automatically operating inflating valves are provided for replenishing the pressure in the tire from the air reservoir. In Fig. 1 three of these replenishing valve devices, 29, are shown, radially arranged in the collar 14 of the disk 7, in position to transfer high-pressure air from the reservoir into the annular air chamber, to compensate for the reduced pressure in the pneumatic tire.

Figures 7, 8:
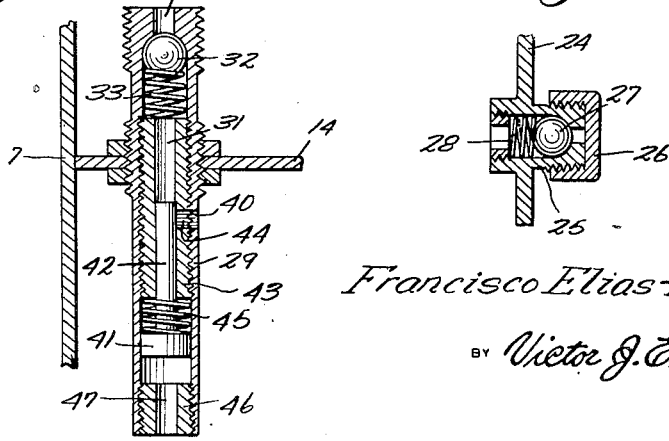
Figure 7 is a sectional detail view of the air supply valve for filling the central air reservoir of the wheel.
Figure 8 is a sectional detail view of one of the plural replenishing valve devices between the air reservoir and the air supply chamber intermediate the reservoir and the pneumatic tire of the wheel.

While I have shown three of these inflating valve devices, it will be understood that this number may be varied to suit different conditions encountered in various wheel structures, and in the detail view Fig. 8 the valve devices each includes a short tube or casing 29 provided with an air tight joint in the collar 14, and having an inlet port 30 at its inner end opening into the reservoir.

An outlet port 31 within the interior of the tube or casing opens to the open exterior or outer end of the tube and the outer end of the tube is open to the interior of the air chamber. A check valve in the form of a ball 32 is pressed by spring 33 to resiliently close the inlet port, and these valve devices are readily accessible for adjustment or repair when the flanged cover plate 24 is removed.

Air communication between the air chamber and the pneumatic tire is accomplished by means of three air ducts or tubes 34, radially arranged in the inner peripheral wall of the tire, and the replenishing air pressure passing through the inflating valve devices is thus conveyed to the interior of the pneumatic tire, to restore the pressure in the tire to a desired degree. Under these conditions the weight of the load on the tire imposes a back pressure that holds the ball valves 32 in their seats closing the inlet ports 30 until a further reduction of pressure in the tire below the pressure in the air reservoir permits opening of the inflating valves, until the pressure of air throughout the wheel spaces and the tire is equalized. Thus, while a puncture or blowout of the tire may result in loss of pressure, the deflation will be gradual and the air pressure within the wheel and tire will provide a cushion that prevents rapid deformation of the tire that might otherwise interfere with control of the vehicle.

As indicated in Fig. 2, in some instances the supply of air to the reservoir may be provided from a motor operated pump or compressor carried by the automotive vehicle, through a central air duct in the axle A, as seen by dotted lines at 36. This duct terminates in a discharge tube 37 that is screwed into the inner wall of the central air duct 36, and a check valve 39 that is spring closed, is opened under pressure for supplying air under pressure to the supply reservoir.

In the design shown the valve 29 is provided with a side outlet opening 40 and a piston 41 with a stem 42 is provided in the inner end wherein with the stem 42 positioned in the opening 31 in the threaded bushing 43 the outlet opening may be opened and closed, and with the piston of a larger diameter than the stem the pressure differential may be considerable. The bushing 43 is provided with an opening 44 that registers with the opening 40 and the piston is resiliently held against the pressure in the hub by a spring 45. The inner end of the valve is provided with a threaded sleeve 46 having an opening 47 therein.

As an example the area of the stem 42 may be one-ninth of the area of the piston 41, and consequently the pressure in the central supply air reservoir will be nine times the pressure in the tire, less the tension of the spring, and as long as these pressures remain equalized the port 40 will remain closed, but should the pressure in the tire drop below thirty pounds to the square inch the spring will move the piston and stem inward and open the port 40.

In some instances and in addition to the use of air pressure within the wheel and tire, hydraulic pressure may also be provided by the use of a viscous liquid.

With the parts arranged in this manner the pneumatic wheel may readily be taken apart or divided which will facilitate removing and replacing the tire and also make it possible to use relatively high side flanges so that the danger of a tire flying off is substantially eliminated. The wheel is also adapted to use conventional tires and tubes now in use.

Other changes may be made, as for instance, a conventional inner tube may be enclosed within the split tire, and the inner wall of the tire may readily be separated for mounting the tube therein.

Having thus fully described my invention, what I claim as new and desire to secure by Letters Patent is:

1. In a vehicle wheel having a pneumatic tire, the combination, with a fixed circular disk and a removable circular disk each having a rim section for supporting the tire and both of said rim sections cooperating to form a rim, of a pair of concentrically spaced collars on the fixed disk, a complementary pair of concentrically spaced attaching flanges on the removable disk, means for rigidly uniting said collars and flanges in pairs to form a central air supply reservoir and an annular air chamber communicating with the tire, and a resiliently closed pressure-opened inflating valve between the reservoir and chamber.

2. In a vehicle wheel having a pneumatic tire, a central supply air reservoir, and an annular air chamber open to the tire and surrounding the reservoir, the combination with a fixed circular disk and a removable circular disk each having a rim section for supporting the tire and both of said rim sections cooperating to form a rim, of a pair of concentrically spaced screw threaded collars on the fixed disk and a complementary pair of screw threaded flanges on the removable disk engaging the collars, and a resiliently-closed pressure-opened inflating valve between the reservoir and the air chamber.

3. In a vehicle wheel having a pneumatic tire, a central air reservoir, an annular air chamber communicating with the tire, and said tire having a split peripheral inner wall, the combination with a fixed circular disk and a removable circular disk each having a rim section for clamping together the split inner wall and each of said rim sections cooperating to form a rim, of a pair of concentrically spaced screw-threaded collars on the fixed disk and a complementary pair of screw threaded attaching flanges on the removable disk, and a resiliently-closed pressure-opened inflating valve between the reservoir and the air chamber.

4. In a vehicle wheel having a pneumatic tire, a central supply air reservoir, and an intermediate annular air chamber in communication with the interior of the tire, the combination with a fixed circular disk and a removable circular disk each having a rim section and said rim sections cooperating to form a rim for supporting the tire, of a pair of concentrically spaced screw threaded collars on the fixed disk and a complementary pair of screw threaded flanges on the removable disk engaging the collars, a flanged cover plate threaded on the inner collar to close the reservoir, a check valve mounted in the cover plate for filling the air reservoir, and a resiliently-closed pressure opened inflating valve between the reservoir and the air chamber.

5. In a vehicle wheel having a pneumatic tire, a central supply air reservoir, and an annular air chamber open to the tire, the combination with a fixed circular disk having bolt holes, bolts, and nuts, for attachment to a rotary part of the vehicle, a removable circular disk, and rim sections on each of said disks, said rim sections cooperating to form a rim for supporting the tire, of a pair of concentrically spaced screw threaded collars on the fixed disk and a complementary pair of screw threaded flanges on the removable disk engaging the collars, and a series of resiliently-closed pressure-opened inflating valves between the reservoir and chamber.

6. In a vehicle wheel for attachment to a rotary part of the vehicle, and including a pneumatic tire, a central air reservoir, and an annular air chamber surrounding the reservoir, the combination with a fixed circular disk and bolts and nuts uniting the disk with said rotary part, a removable circular disk, and rim sections on each of said disks, said rim sections cooperating to form a rim for supporting the tire, of a pair of concentrically spaced screw threaded collars on the fixed disk, a complementary pair of screw threaded flanges on the removable disk engaging the collars, a cover plate threaded on the inner collar for closing the reservoir and a filling valve in said plate, a plurality of resiliently-closed and pressure-opened inflating valves between the reservoir and the air chamber, and a plurality of air ducts between the air chamber and the pneumatic tire.

7. In a vehicle wheel for pneumatic tires, an inner section having a peripheral tire holding rim section and a centrally disposed drum-like threaded hub, said inner section having openings adapted to receive wheel mounting studs, an outer section also having a tire holding rim section and a centrally disposed hub with the rim section and hub threaded on the rim section and hub of the inner section, said rim sections cooperating to form a rim, a cap threaded on the hub of the inner section locking the outer section thereon, inflating means in the cap, and pressure responsive inflating valves between the hub and rim whereby a tire on the rim may receive air from the hub.

8. A vehicle wheel as described in claim 7, wherein pressure may be supplied to the drum-like hub from a compressor on the vehicle through the axle of the wheel.

9. In a vehicle wheel as described in claim 7, means sealing the end of the axle in the said drum-like hub.

F. ELIAS-REYES.

REFERENCES CITED

The following references are of record in the file of this patent:

UNITED STATES PATENTS

| Number | Name | Date |
| --- | --- | --- |
| 1,464,441 | Osborn | Aug. 7, 1923 |
| 1,470,938 | Semery | Oct. 16, 1923 |
| 1,710,265 | Lewellyn | Apr. 23, 1929 |
| 2,017,034 | Avery | Oct. 15, 1935 |
| 2,141,542 | Mann | Dec. 27, 1938 |
| 2,176,914 | Massa | Oct. 24, 1939 |